(12) United States Patent
Ekonen et al.

(10) Patent No.: US 7,828,130 B2
(45) Date of Patent: *Nov. 9, 2010

(54) TORQUE COUPLING WITH DISCONNECTABLE FLUID PUMP

(75) Inventors: Todd Ekonen, Howell, MI (US); Philip J. Francis, Lapeer, MI (US)

(73) Assignee: MAGNA Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,217

(22) Filed: Nov. 3, 2009

(65) Prior Publication Data

US 2010/0044181 A1 Feb. 25, 2010

Related U.S. Application Data

(63) Continuation of application No. 11/507,317, filed on Aug. 21, 2006, now Pat. No. 7,624,853.

(60) Provisional application No. 60/716,381, filed on Sep. 12, 2005.

(51) Int. Cl.
*F16D 28/00* (2006.01)
*B60K 17/02* (2006.01)

(52) U.S. Cl. .................. 192/48.2; 192/84.6; 192/84.92; 192/113.3

(58) Field of Classification Search .............. 192/113.3; 417/223

See application file for complete search history.

(56) References Cited

U.S. PATENT DOCUMENTS

| 5,310,388 | A | 5/1994 | Okcuoglu et al. | |
|---|---|---|---|---|
| 5,388,669 | A | 2/1995 | Holl et al. | |
| 5,827,145 | A | 10/1998 | Okcuoglu | |
| 6,378,682 | B1 | 4/2002 | Mohan et al. | |
| 6,626,787 | B2 | 9/2003 | Porter | |
| 7,361,114 | B2 | 4/2008 | Boddy | |
| 7,445,438 | B2 | 11/2008 | Ronk et al. | |
| 7,452,301 | B2 | 11/2008 | Yoshioka | |
| 7,533,754 | B2 | 5/2009 | Burrows et al. | |
| 7,568,568 | B2 * | 8/2009 | Porter et al. ................... | 192/35 |
| 7,624,853 | B2 * | 12/2009 | Ekonen et al. ............. | 192/84.6 |
| 7,635,055 | B2 * | 12/2009 | Ekonen et al. ............. | 192/84.6 |
| 2004/0188209 | A1 * | 9/2004 | Leber ......................... | 192/3.25 |
| 2007/0056822 | A1 | 3/2007 | Porter et al. | |
| 2007/0056824 | A1 | 3/2007 | Ekonen et al. | |

* cited by examiner

*Primary Examiner*—Rodney H Bonck
(74) *Attorney, Agent, or Firm*—Harness, Dickey & Pierce, P.L.C.

(57) ABSTRACT

A pump system that pressurizes a fluid includes a shaft, a first rotor and a second rotor that is selectively driven by the shaft. Relative rotation between the first rotor and the second rotor generates variable sized pockets therebetween to pressurize the fluid. A clutch regulates a degree of coupling of the rotor to the shaft between a decoupled state and a coupled state to regulate the relative rotation between the first and second rotors.

27 Claims, 7 Drawing Sheets

TORQUE COUPLING WITH DISCONNECTABLE FLUID PUMP

CROSS-REFERENCE TO RELATED APPLICATIONS

This application is a continuation of U.S. patent application Ser. No. 11/507,317 filed on Aug. 21, 2006, which claims benefit to U.S. Provisional Application No. 60/716,381 filed Sep. 12, 2005, the entire disclosures of which are hereby incorporated by reference.

FIELD OF THE INVENTION

The present invention relates generally to torque couplings for use in vehicular power transfer systems and, more particularly, to torque couplings equipped with a mechanism for selectively connecting a fluid pump.

BACKGROUND OF THE INVENTION

Power transfer systems of the type used in motor vehicles including, but not limited to, transfer cases, power take-off units (PTU) and drive axles are commonly equipped with a torque biasing system. Typical torque biasing systems function to regulate the transfer of drive torque between an input and an output. Typically, a multi-plate friction clutch pack is operably disposed between the input and the output and engagement of the clutch pack is varied to regulate the amount of drive torque transferred from the input to the output. For example, there is no torque transfer from the input to the output when the clutch pack is disengaged. In contrast, all of the drive torque is transferred from the input to the output when the clutch pack is fully engaged. When the clutch pack is partially engaged, a corresponding portion of the drive torque is transferred.

The degree of clutch pack engagement is adjusted by an engagement force that is imparted on the clutch pack via a clutch actuator system. Traditional clutch actuator systems include a power-operated drive mechanism that is operable to drive a clutch operator mechanism. The clutch operator mechanism converts the force or torque generated by the power-operated drive mechanism into the engagement force, which can be amplified prior to being applied to the clutch pack. The power-operated drive mechanism is typically controlled based on control signals generated by an electronic control system.

The quality and accuracy of torque transfer across the clutch pack is based on the frictional interface between the clutch plates. When the clutch pack is partially engaged, the clutch plates slip relative to one another and generate heat. To remove such heat, lubricating fluid is typically directed through the clutch pack to cool the plates as well as other clutch pack components. Excessive heat generation, however, can degrade the lubricating fluid and damage the clutch plates and/or the clutch pack components. Additionally, traction control systems require the clutch control system to respond to torque commands in a quick and accurate manner. The accuracy of meeting the torque request is largely dependent on the coefficient of friction of the clutch pack. It has been demonstrated that this coefficient can change quite rapidly under various loading and/or slip conditions. In particular, the coefficient tends to fade due to significant temperature increases in the clutch pack which result from insufficient rate of heat removal. The heat removal rate is primarily dependent upon the flow rate and condition of the lubricating fluid.

Traditional lubrication systems typically include a shaft-driven fluid pump that supplies the lubricating fluid to the clutch pack. The fluid pump is usually a unidirectional pump such that it provides no fluid flow when the vehicle is in the reverse mode of operation, even though torque requests may still occur. For instance, the vehicle may be subjected to backing up a dirt, gravel or snow-packed hill where operation in the AWD/4WD mode may be needed. Additionally, shaft-driven pumps are always driven when the vehicle is in forward motion. In many cases, however, the flow of lubricating fluid is not required until heat is actually generated on the highly loaded components, such as during clutch slip conditions. Furthermore, because shaft-driven fluid pumps are always pumping, inefficiencies are realized and fuel economy is negatively impacted.

Another shortfall of traditional lubrication systems is the increased pump capacity required to deliver sufficient lubricating fluid to the clutch pack at lower shaft speeds. Low shaft speeds are typically encountered in parking lot maneuvers, where tests for torque accuracy are typically performed. Increasing the pump capacity further increases the negative impact the lubrication system has on fuel economy, as well as creating potential for pump cavitation at higher shaft speeds.

Thus, a need exists to provide an improved lubrication system for use in torque couplings of the type used in vehicular power transfer systems. The improved lubrication system would overcome the drawbacks associated with conventional lubrication systems by providing superior heat removal characteristics while aiding in extending the service life of the clutch plates.

SUMMARY OF THE INVENTION

It is an objective of the present invention to provide an on-demand lubrication system for power transfer assemblies of the type used for transferring drive torque and/or limiting slip in vehicular driveline applications.

It is another objective of the present invention to provide an on-demand lubrication system having a fluid pump and a pump clutch that is operable to shift the fluid pump between an operative state and a non-operative state.

A related objective of the present invention is related to providing the pump clutch with a mechanism for selectively coupling and uncoupling a pump component of the fluid pump to a driven shaft for establishing its operative and non-operative states.

Accordingly, the present invention provides a pump system for selectively pressurizing a fluid. The pump system includes a shaft, a fluid pump having a pump component that can selectively driven by the shaft, and a pump clutch. When driven by the shaft, the pump component generates a pumping action that is operable for drawing low pressure fluid from a sump and a discharging fluid at a higher pressure. The pump clutch is operable to selectively couple the pump component to the shaft and can be selectively shifted between a decoupled state and a coupled state for regulating functional operation of the fluid pump.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transfer systems for use in motor vehicle. Thus, while the present invention is hereinafter described in association with a particular arrangement for use in a specific driveline application, it will be understood that the arrangement shown and described is merely intended to illustrate possible embodiments of the present invention.

Figure 1:
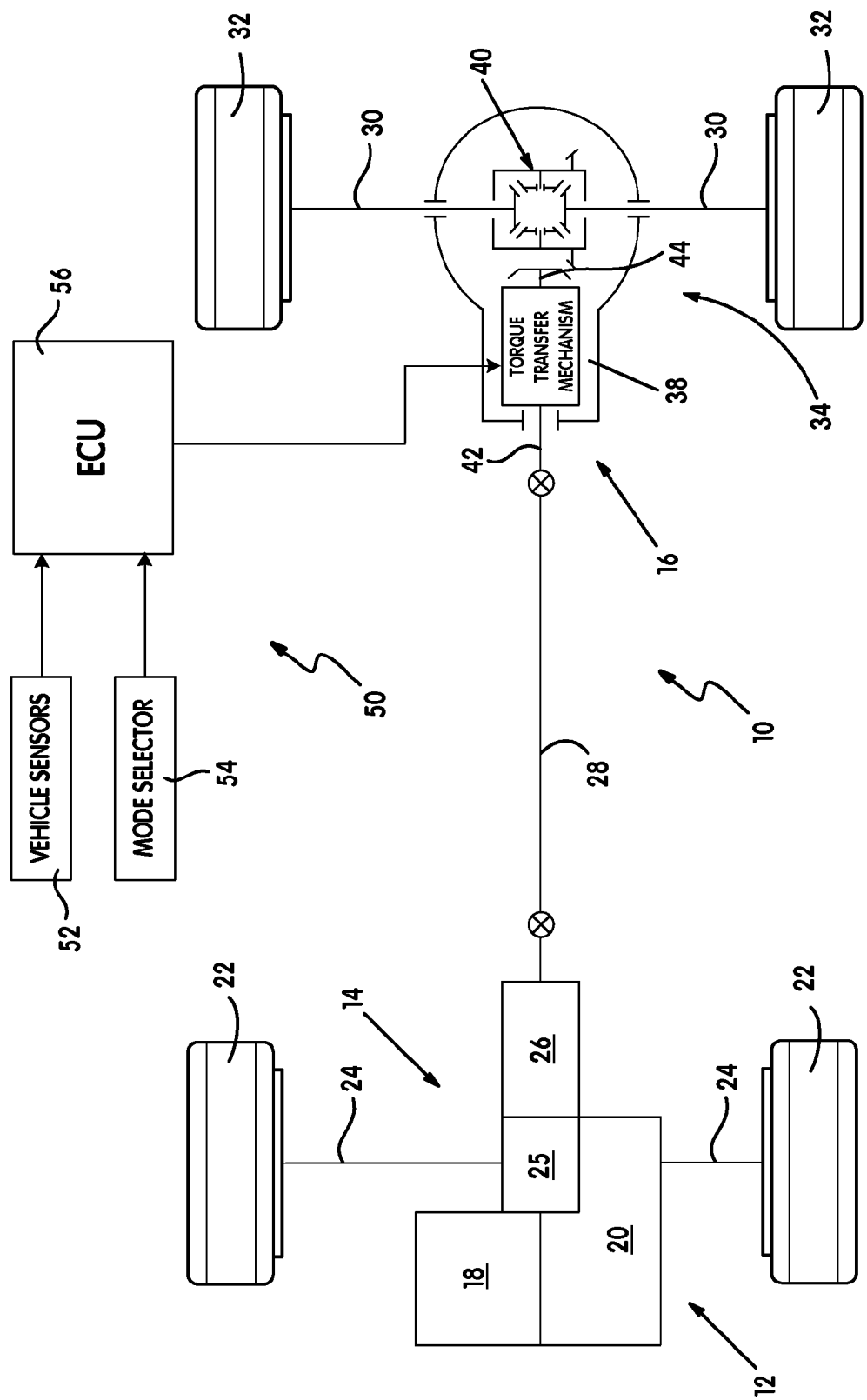
FIG. 1 illustrates an exemplary drivetrain of a four-wheel drive vehicle equipped with a power transfer system having a torque transfer mechanism according to the present invention.

With particular reference to FIG. 1, a schematic layout of an exemplary vehicle drivetrain 10 is shown to include a powertrain 12, a first or primary driveline 14 driven by powertrain 12, and a second or secondary driveline 16. Powertrain 12 includes an engine 18 and a multi-speed transaxle 20 arranged to normally provide motive power (i.e., drive torque) to a pair of first wheels 22 associated with primary driveline 14. Primary driveline 14 further includes a pair of axleshafts 24 connecting wheels 22 to a differential unit 25 associated with transaxle 20.

Secondary driveline 16 includes a power take-off unit (PTU) 26 driven by the output of differential unit 25 within transaxle 20, a propshaft 28 driven by PTU 26, a pair of axleshafts 30 connected to a pair of second wheels 32, and a power transfer device 34 that is operable to selectively transfer drive torque from propshaft 28 to axleshafts 30. Power transfer device 34 is provided as a drive axle assembly and includes a torque transfer mechanism 38 and a differential unit 40. Torque transfer mechanism 38 functions to selectively transfer drive torque from propshaft 28 to differential unit 40 which, in turn, drives axleshaft 30. More specifically, torque transfer mechanism 38 includes an input shaft 42 driven by propshaft 28 and a pinion shaft 44 that drives differential unit 40.

Vehicle drivetrain 10 further includes a control system 50, vehicle sensors 52 and a mode select mechanism 54. Control system 50 regulates actuation of torque transfer mechanism 38. Vehicle sensors 52 detect dynamic and operational characteristics of drivetrain 10. Mode select mechanism 54 enables an operator to select one of a plurality of available drive modes. In this embodiment, drive modes include a two-wheel drive mode, a locked ("part-time") four-wheel drive mode, and an adaptive ("on-demand") four-wheel drive mode. In this regard, torque biasing mechanism 38 can be selectively engaged for transferring drive torque from input shaft 42 to pinion shaft 44 for establishing both of the part-time and on-demand four-wheel drive modes. An electronic control unit (ECU) 56 controls operation of the components associated with control system 50 which, in turn, controls torque transfer mechanism 38.

Figure 2:
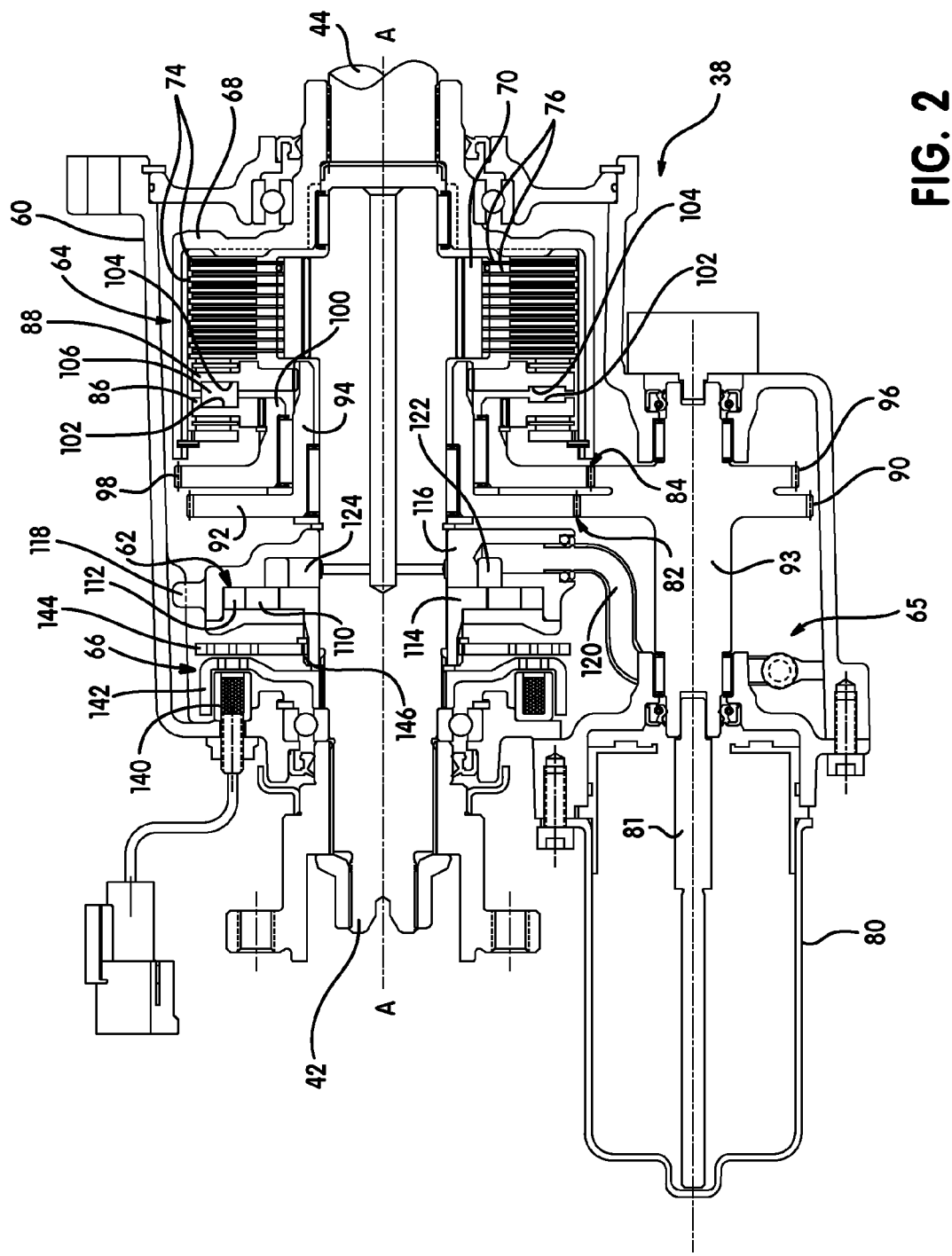
FIG. 2 is a sectional view of a torque transfer mechanism having a pump clutch operable for selectively engaging a fluid pump according to a first embodiment of the present invention.

Referring now to FIG. 2, a partial cross-section of torque transfer mechanism 38 is illustrated. Torque transfer mechanism 38 includes a housing 60 that encloses a hydraulic pump 62, a transfer clutch 64, a clutch actuator 65 and a pump clutch 66. In operation, input shaft 42 is selectively coupled to pinion shaft 44 via engagement of transfer clutch 64. Transfer clutch 64 is varied between a disengaged state and an engaged state to regulate torque transfer between input shaft 42 and pinion shaft 44. More specifically, clutch actuator 65 regulates the degree of engagement of a clutch pack associated with transfer clutch 64, as described in further detail below. Hydraulic pump 62 is operable to provide pressurized fluid for cooling the clutch pack based on relative rotation between input shaft 42 and pinion shaft 44. In addition, pump clutch 66 is operable to regulate the pumping action of pump 62. More specifically, pump clutch 66 regulates operation of pump 62 between a disengaged state and an engaged state to vary the pressure of the fluid discharged therefrom, as explained in further detail below.

Transfer clutch 64 includes a drum 68 that is fixed for rotation with pinion shaft 44 and a hub 70 that is fixed for rotation with input shaft 42. A first plurality of clutch plates 74 are fixed to drum 68 and extend radially inward. A second plurality of clutch plates 76 are fixed to hub 70 and extend radially outward and are interleaved with clutch plates 74. The degree of engagement of the multi-plate clutch pack, and therefore the amount of torque transferred therethrough, is based on the interaction of clutch plates 74 and 76. More specifically, in a disengaged state, clutch plates 74 and 76 slip relative to one another and no torque is transferred through transfer clutch 64. In a fully engaged state, there is no relative slip between clutch plates 74 and 76 and 100% of the drive torque is transferred from input shaft 42 to pinion shaft 44. In a partially engaged state, the degree of relative slip between clutch plates 74 and 76 varies and a corresponding amount of drive torque is transferred through transfer clutch 64.

Clutch actuator 65 controls the degree of clutch pack engagement and includes an electric motor 80 having a motor shaft 81 driving first and second gearsets 82 and 84, a reaction cam plate 86 and an engagement cam plate 88. First gearset 82 includes a first pinion gear 90 that is meshed with a first drive gear 92. First pinion gear 90 is integrally formed on a stub shaft 93 that is driven by motor shaft 81. In addition, first drive gear 92 is integrally formed on a first tubular hub 94 that is rotatably supported on input shaft 42. Second gearset 84 includes a second pinion gear 96 formed on stub shaft 93 and which is meshed with a second drive gear 98. Second drive gear 98 is integrally formed on a second tubular hub 100 that is rotatably supported on first hub 94. As seen, first hub 94 is in splined engagement with engagement cam plate 88 while second hub 100 is in splined engagement with reaction cam plate 86. Reaction cam plate 86 includes one or more ramped grooves 102 while engagement plate 88 also includes a corresponding number of ramped grooves 104. Rolling elements 106 are disposed between reaction cam plate 86 and engagement cam plate 88 and ride within aligned sets of ramped grooves 102 and 104.

Electric motor 80 induces common rotation of first pinion gear 90 and second pinion gear 96 which, in turn, respectively drive first and second drive gears 92 and 98. The number of gear teeth selected for the gear components of first gearset 82 and second gearset 84 are adapted to generate relative rotation between first hub 94 and second hub 100 in response to rotation of motor shaft 81. Accordingly, such relative rotation results in similar relative rotation between reaction cam plate 86 and engagement cam plate 88. As engagement cam plate 88 rotates relative to reaction cam plate 86, rolling elements 106 ride within ramped grooves 102 and 104 and cause engagement cam plate 88 to move axially relative to reaction cam plate 86. In this manner, engagement cam plate 88 is capable of exerting a linearly-directed clutch engagement force on the clutch pack so as to regulate engagement of transfer clutch 64.

Pump 62 is shown as a gerotor-type pump and includes an inner pump rotor 110 and an outer pump rotor 112. As will be detailed, inner pump rotor 110 is selectively coupled to input shaft 42 through pump clutch 66. Inner rotor 110 is fixed (i.e., splined) for common rotation with a pump hub 114. Pump hub 114 is concentrically aligned with and free to rotate about input shaft 42. Outer pump rotor 112 is supported in a pump housing 116 which is non-rotatably fixed via a splined connection 118 to housing 60. Pumping chambers are defined between the inner and outer pump rotors. The volume of the pumping chambers varies based on relative rotation between inner and outer rotors 110 and 112. More specifically, when inner pump rotor 110 is caused to rotate at a different speed than outer pump rotor 112, the pumping chambers are induced to expand and contract. Expansion of the pumping chambers draws fluid into a pumping chamber from a sump while contraction of a pumping chamber pressurizes and discharges the fluid from pump 62. As seen in FIG. 2, fluid from the sump is drawn through an inlet hose 120 to an inlet chamber 122 of pump 62. The higher pressure fluid is discharged into an outlet chamber 124 and is supplied via flow paths to lubricate and cool the clutch pack as well as other rotary components and bearings.

Pump clutch 66 includes an electromagnetic (EM) actuator 140, a first clutch plate 142 and a second clutch plate 144. EM actuator 140 is fixed to housing 60 and first clutch plate 142 is splined to input shaft 42 for common rotation therewith. Second clutch plate 144 is fixed (i.e., splined) for rotation with inner rotor 110 of pump 62 via hub 114 and is slidable along the axis A. Specifically, second clutch plate 144 is coupled via a splined connection 146 to hub 114. Pump clutch 66 is operable in a first or "engaged" state to couple inner rotor 110 for rotation with input shaft 42 and in a second or "disengaged" state to de-couple inner rotor 110 from rotation with input shaft 42. More specifically, when EM coil 140 is energized, second clutch plate 144 slides along the A axis and is coupled to first clutch plate 142. In this manner, inner rotor 110 is driven by input shaft 42 through engagement of first and second clutch plate 142 and 144 so as to permit pump 62 to generate the fluid pumping action. When EM coil 140 is de-energized, second clutch plate 144 is free to rotate independent of first clutch plate 142, whereby inner rotor 110 is not driven by input shaft 42. EM coil 140 receives electric control signals from ECU 56.

Figure 3:
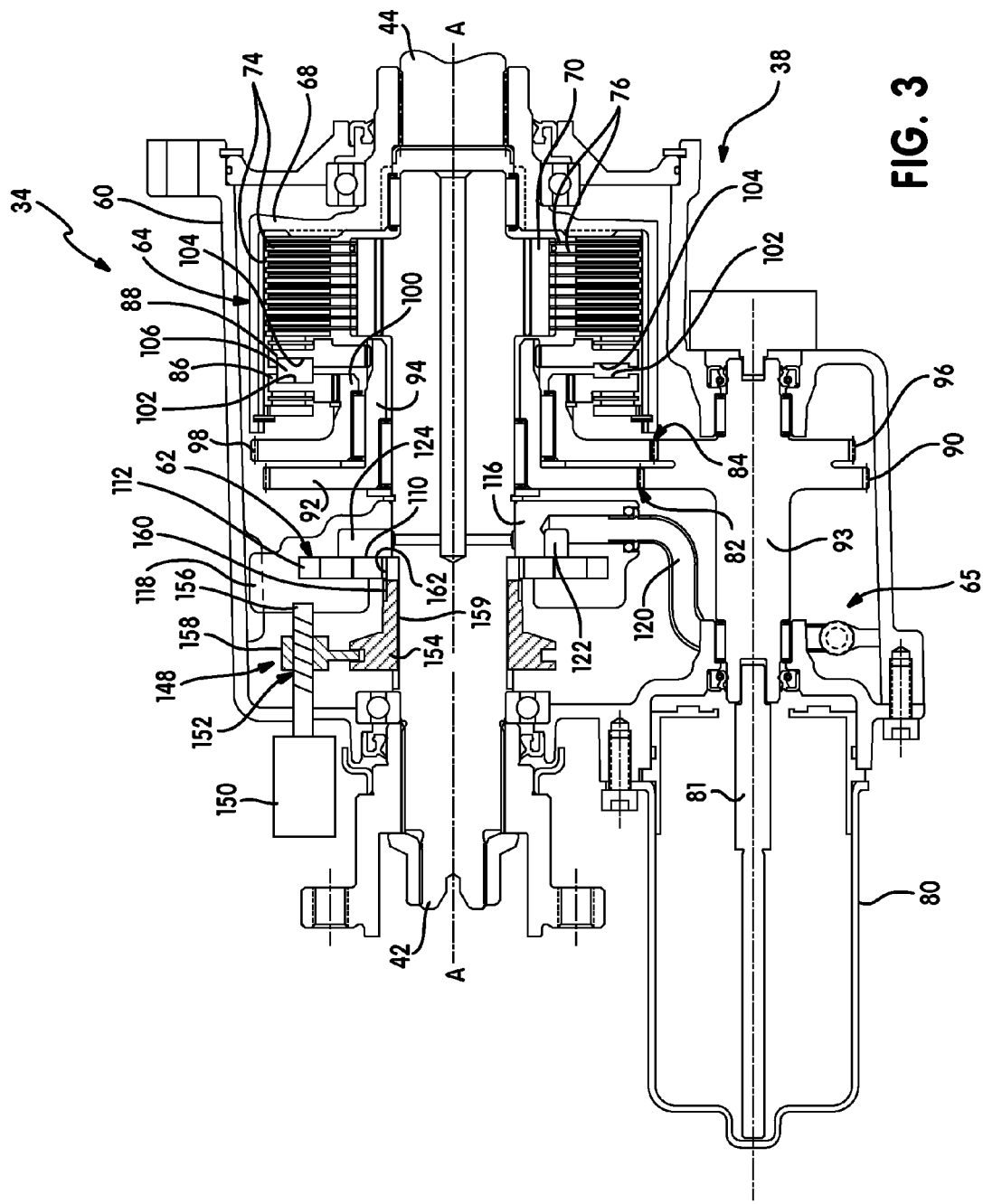
FIG. 3 is a sectional view of a torque transfer mechanism having a pump clutch operable for selectively engaging a fluid pump according to a second embodiment of the present invention.

Referring now to FIG. 3, torque transfer mechanism 38 is now shown to include an alternative pump clutch 148 that selectively enables pump 62 to pump cooling fluid to the clutch pack of transfer clutch 64. Pump clutch 148 includes an electric motor 150, a screw drive mechanism 152 and a sliding hub 154. Screw drive mechanism 152 includes a threaded shaft 156 driven by electric motor 150 and a collar 158 that is in threaded engagement with threaded shaft 156 and which is axially movable along the axis of threaded shaft 156. Collar 158 engages hub 154 to axially move hub 154 along the A axis of input shaft 42. Hub 154 is fixed for rotation with input shaft 42 via a splined engagement 159. Hub 154 includes external clutch teeth 160 that can selectively engage internal clutch teeth 162 on inner rotor 110 of pump 62. In a disengaged mode, motor 150 drives screw 156 until collar 158 is retracted, whereby hub 154 is also moved to a retracted position. As such, clutch teeth 160 on hub 154 are moved out of engagement with clutch teeth 162 on inner rotor 110, whereby no fluid is pumped through pump 62. In an engaged mode, electric motor 150 drives screw 156 until collar 158 axially moves hub 154 to an extended position whereat its clutch teeth 160 engage clutch teeth 162 on inner rotor 110, thereby fixing inner rotor 110 for rotation with hub 154. In this manner, inner rotor 110 can rotate relative to outer rotor 112 and fluid is pumped through pump 62.

Figure 4:
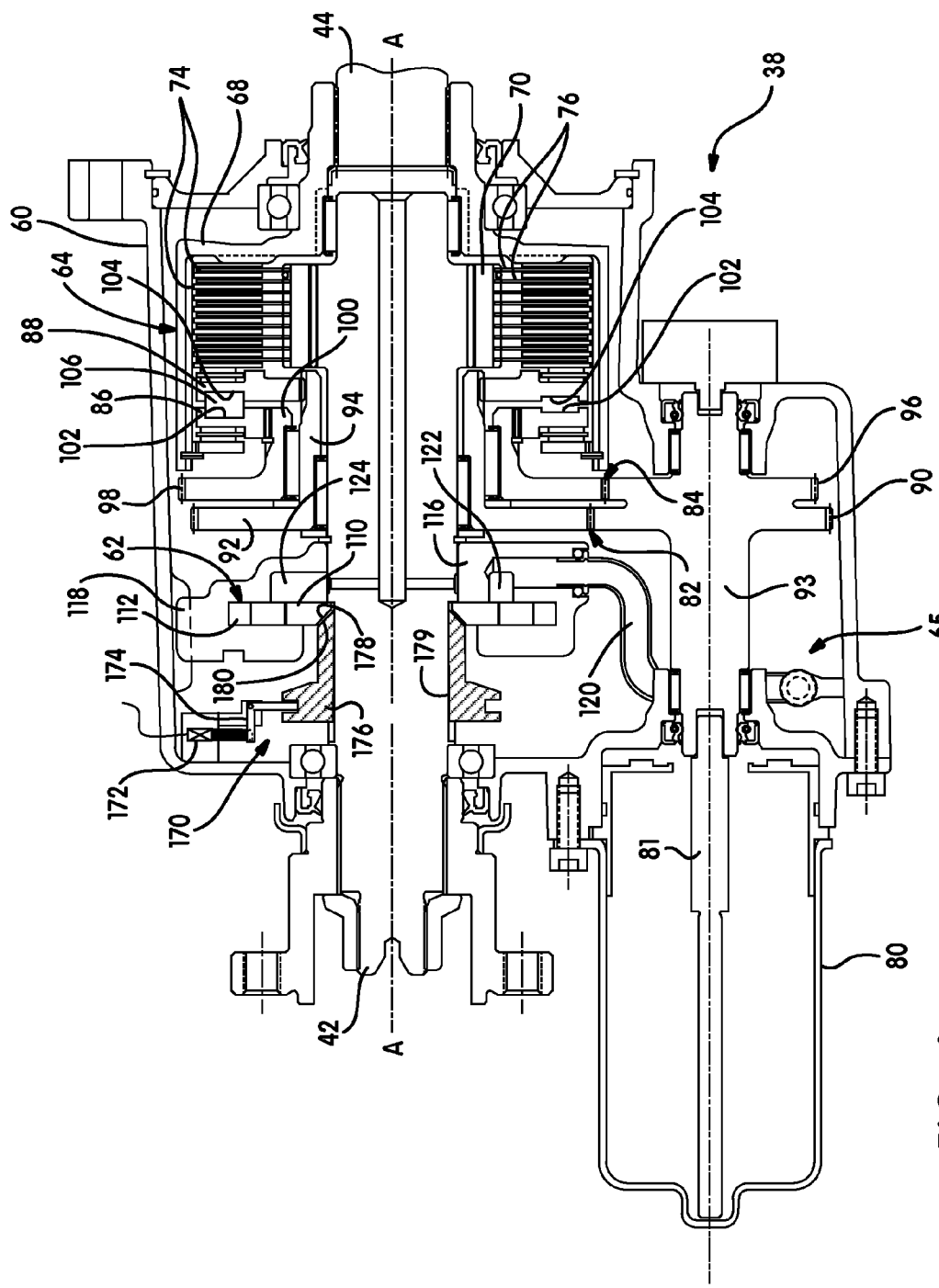
FIG. 4 is a sectional view of a torque transfer mechanism having a pump clutch operable for selectively engaging a fluid pump according to a third embodiment of the present invention.

Referring now to FIG. 4, torque transfer mechanism 38 is shown to include another alternative pump clutch 170 that selectively enables pump 62 to pump cooling fluid to the clutch pack. Pump clutch 170 includes an electromagnetic (EM) solenoid 172, a lever 174 and a sliding hub 176. EM solenoid 172 is selectively energized and de-energized by control system 50. Lever 174 is generally L-shaped and is pivotally supported by housing 60. Lever 174 engages hub 176 to axially move hub 176 along the A axis. Hub 176 is fixed for rotation with input shaft 42 via a splined engagement 179. Hub 176 includes a conical face surface 178 that can selectively engage a conical face surface 180 formed on inner rotor 110 of pump 62. In a disengaged mode, EM solenoid 172 is de-energized and hub 176 is retracted such that its conical face surface 178 is released from engagement with conical face surface 180 on inner rotor 110, whereby no fluid is pumped through pump 62. In an engaged mode, EM solenoid 172 is energized to move lever 174 so as to engage inner rotor 110 and hub 176 for common rotation. In this manner, inner rotor 110 rotates relative to outer rotor 112 and fluid is pumped through pump 62.

Figure 5:
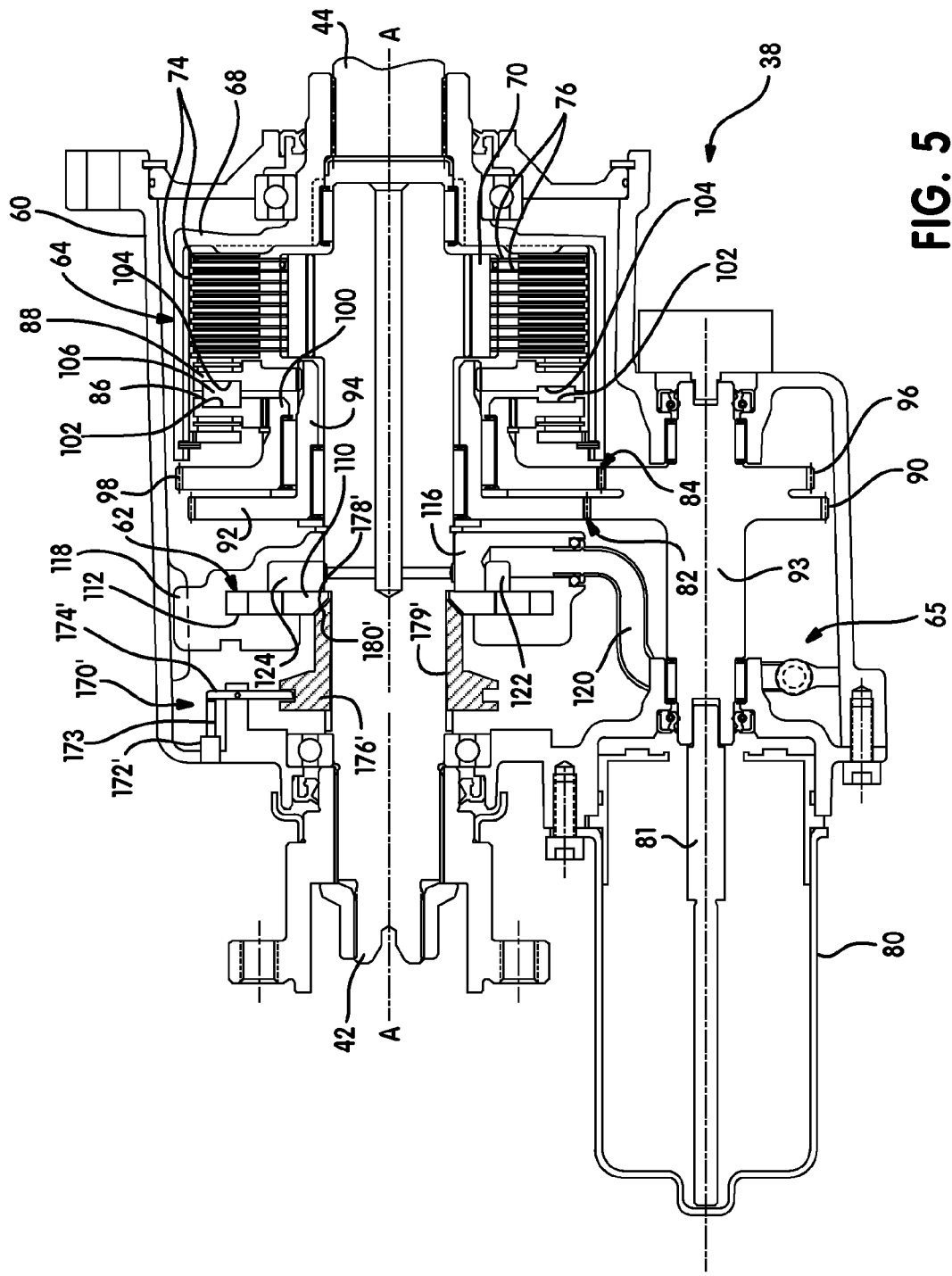
FIG. 5 is a sectional view of a torque transfer mechanism having a pump clutch operable for selectively engaging a fluid pump according to a fourth embodiment of the present invention.

Referring now to FIG. 5, torque transfer mechanism 38 is shown to include another alternative pump actuator 170' that selectively enables pump 62 to pump cooling fluid to the clutch pack of transfer clutch 64. The pump actuator 170' includes an electromagnetic (EM) solenoid 172' having an axially displaceable plunger 173, a pivot lever 174' and a sliding hub 176'. EM solenoid 172' is selectively energized and de-energized by control system 50. Lever 174' is pivotally supported by housing 60. Lever 174' engages hub 176' to axially move hub 176' along the A axis in response to pivotal movement of lever 174'. Hub 176' is fixed for rotation with input shaft 42 via a splined engagement 179'. Hub 176' includes a conical face surface 178' that is adapted to selectively engage a conical face surface 180' on inner rotor 110 of pump 62. In a disengaged mode, EM solenoid 172' is de-energized and plunger 173 is extended such that hub 176' is retracted out of engagement with inner rotor 110, whereby no fluid is pumped through pump 62. In an engaged mode, EM solenoid 172' is energized to retract plunger 173 and extend lever 174' so as to engage inner rotor 110 and hub 176' for common rotation. In this manner, inner rotor 110 rotates relative to outer rotor 112 and fluid is pumped through pump 62.

Figure 6:
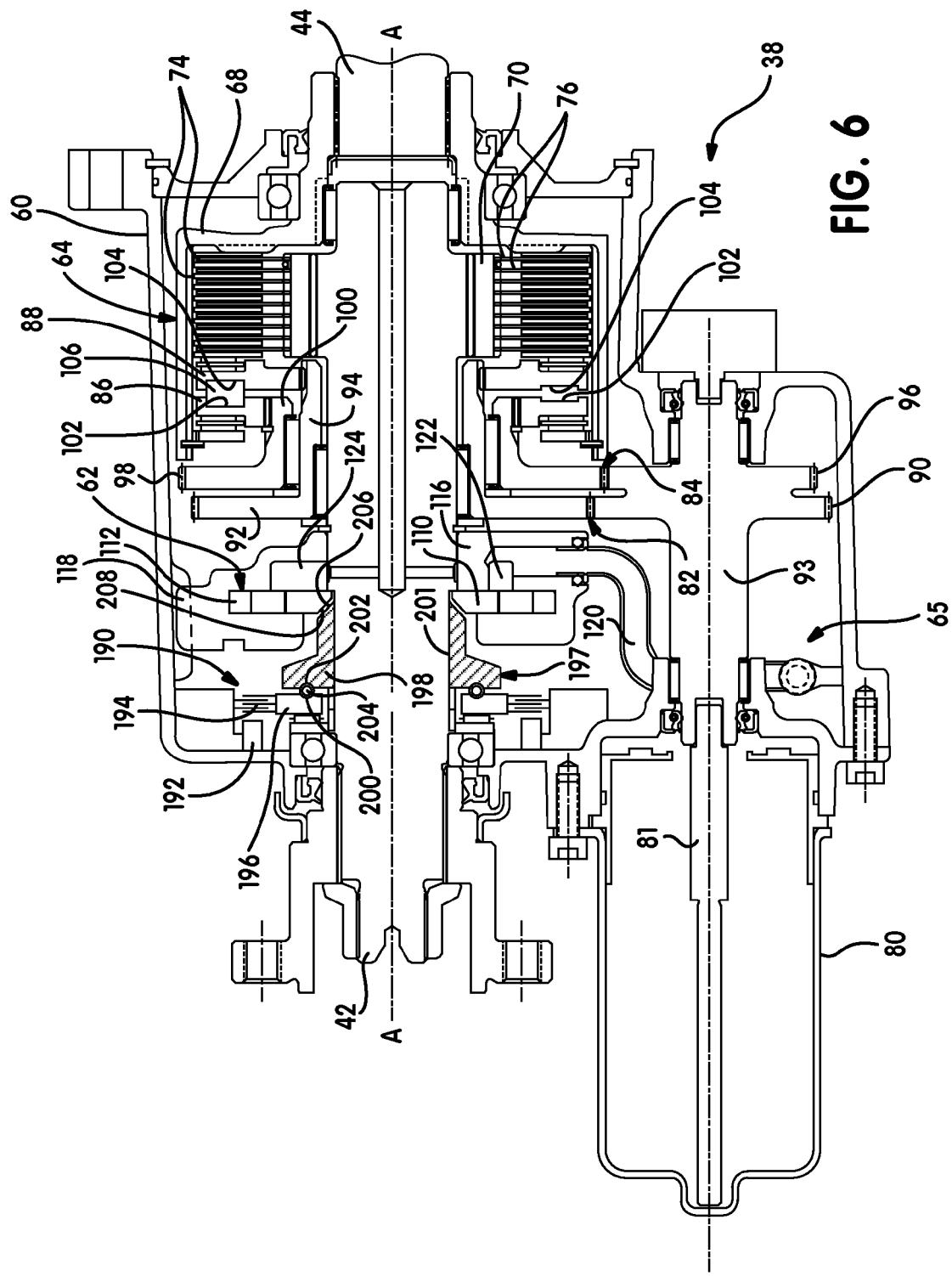
FIG. 6 is a sectional view of a torque transfer mechanism having a pump clutch operable for selectively engaging a fluid pump according to a fifth embodiment of the present invention.

Referring now to FIG. 6, torque transfer mechanism 38 includes still another alternative pump actuator 190 that selectively enables pump 62 to pump cooling fluid to the clutch pack of transfer clutch 64. Pump actuator 190 includes an electromagnetic (EM) coil 192, a clutch pack 194 of interleaved clutch plates, a ball ramp unit 197 and a hub 198. Ball ramp unit 197 includes a stop plate 196 that is rotatably supported about input shaft 42 and has a ramped groove 200. Hub 198 is fixed for rotation with input shaft 42 via a splined engagement 201 and is axially movable along the A axis. Hub 198 also includes a ramped groove 202 that corresponds to ramped groove 200 of stop plate 196. A ball 204 rides within ramped grooves 200 and 202 to regulate the axial position of hub 198 along the A axis. Hub 198 further includes a conical face surface 206 that corresponds to a conical face surface 208 on inner rotor 110 of pump 62. The conical faces 206 and 208 can be placed in selective engagement so as to permit inner rotor 110 to rotate relative to outer rotor 112 and pump fluid through pump 62.

A first plurality of the clutch plates associated with clutch pack 194 are fixed to housing 60 and extend radially inward toward stop plate 196. A second plurality of clutch plates associated with clutch pack 194 are fixed for rotation with stop plate 196. In an engaged mode, EM coil 192 is energized to draw interleaved clutch plates 194 into engagement. In this manner, stop plate 196 is braked against rotation. As a result, hub 198 rotates relative to stop plate 196 inducing ball 204 to ride up ramped grooves 200 and 202. Ball 204 axially pushes hub 198 away from stop plate 196 and into engagement with inner rotor 110 to fix inner rotor 110 for rotation with hub 198. In a disengaged mode, EM coil 192 is de-energized and stop plate 196 is free to rotate about input shaft 42. As a result, ball 204 relieves pressure on hub 198 such that hub 198 is permitted to disengage inner rotor 110.

Figure 7:
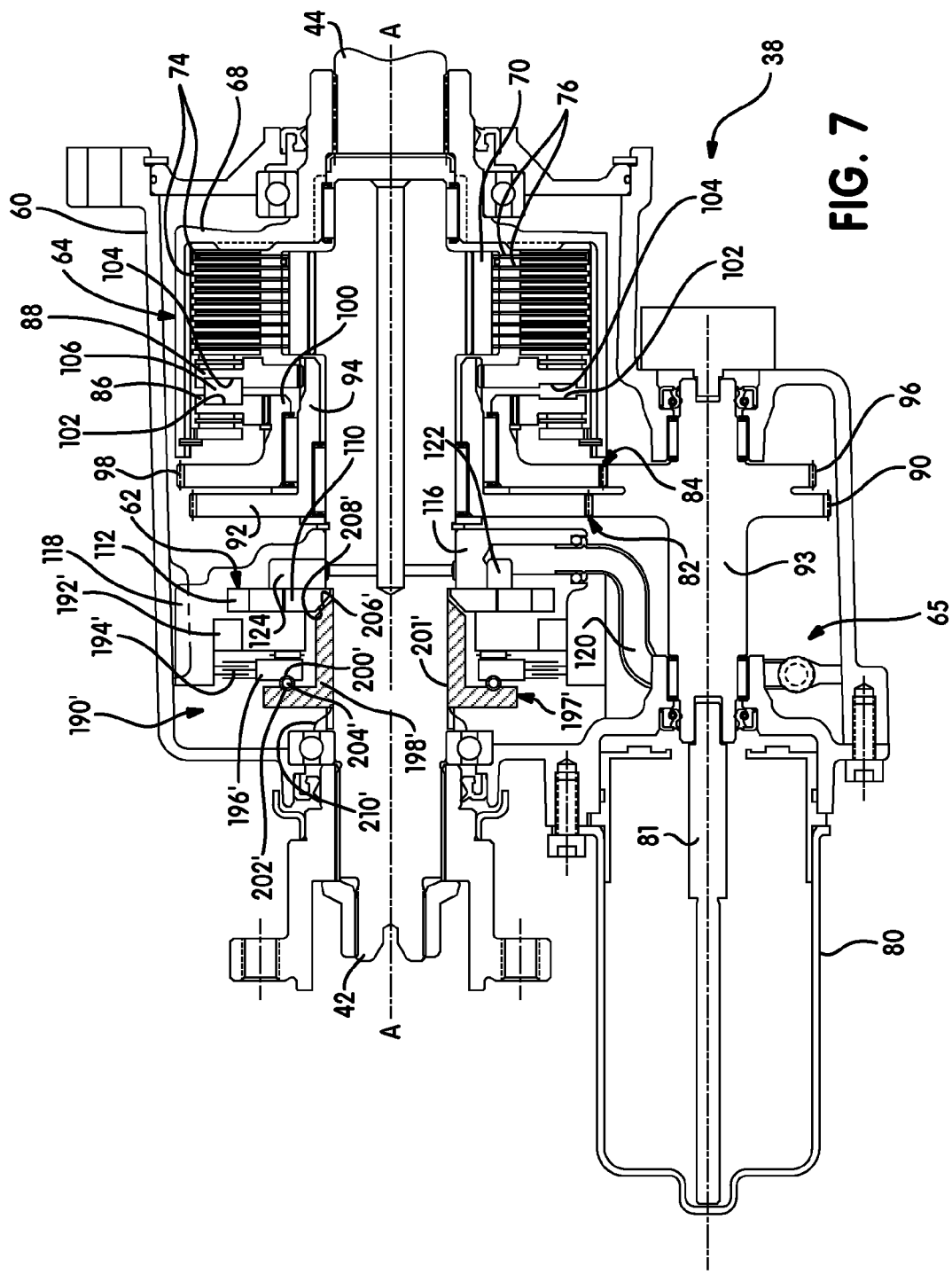
FIG. 7 is a sectional view of a torque transfer mechanism having a pump clutch operable for selectively engaging a fluid pump according to a sixth embodiment of the present invention.

Referring now to FIG. 7, torque transfer mechanism 38 is shown to include another alternative pump clutch 190' that selectively enables pump 62 to pump cooling fluid to the clutch pack of transfer clutch 64. Pump actuator 190' includes an electromagnetic (EM) coil 192', a set of interleaved plates 194', a ball ramp unit 197' and a hub 198'. Ball ramp unit 197' includes a stop plate 196' that is rotatably supported about input shaft 42 and includes a ramped groove 200'. Hub 198' is fixed for rotation with input shaft 42 via a splined engagement 201' and is axially movable along the axis A. Hub 198' also includes a ramped groove 202' that corresponds to ramped groove 200' of stop plate 196'. A ball 204' rides within ramped grooves 200' and 202' to regulate a position of hub 198' along the axis A. Hub 198' further includes and a conical face 206' that corresponds to a conical face 208' of inner rotor 110 of pump 62. Conical faces 206 and 208 are in selective engagement to rotate inner rotor 110 relative to outer rotor 112 and pump through pump 62. A spring 210' biases hub 198' toward inner rotor 110.

A first plurality of interleaved plates 194' are fixed to housing 60 and extend radially inward toward stop plate 196'. A second plurality of interleaved plates 194' are fixed for rotation with stop plate 196'. In a disengaged mode, EM coil 192' is energized to draw interleaved plates 194' into engagement. In this manner, stop plate 196' is braked against rotation. As a result, hub 198' rotates relative to stop plate 196' inducing ball 204' to ride up ramped grooves 200' and 202'. Ball 204' pushes hub 198' away from stop plate 196' and against bias force of the spring 210'. In an engaged mode, EM coil 192' is de-energized and stop plate 196' is free to rotate about input shaft 42. As a result, ball 204' relieves pressure on hub 198' and hub 198 is pushed by the bias force of spring 210' into engagement with inner rotor 110.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A torque coupling, comprising:
    a first rotary member;
    a second rotary member;
    a torque transfer clutch operably disposed between said first and second rotary members;
    a fluid pump operable for generating a fluid pumping action in response to rotation of a pump component;
    a pump clutch operable for selectively coupling said pump component to one of said first and second rotary members; and
    a control system for selectively actuating said pump clutch, wherein said fluid pump is a gerotor pump having an inner rotor as its pump component, and wherein said pump clutch is operable for releaseably coupling said inner rotor for rotation with said first rotary member.

2. The torque coupling of claim 1 wherein said control system is operable for selectively shifting said pump clutch between an engaged state and disengaged state, wherein said pump clutch is operable in its engaged state to couple said pump component for rotation with a corresponding one of said first and second rotary members, and wherein said pump clutch is operable in its disengaged state to release said pump component from coupled engagement with the corresponding one of said first and second rotary members.

3. The torque coupling of claim 2 wherein said pump clutch includes a clutch component that is moveable between first and second positions and a power-operated actuator for controlling movement of said clutch component, and wherein said control system is operable for generating and sending a control signal to said power-operated actuator for moving said clutch component between its first and second positions.

4. The torque coupling of claim 3 wherein said clutch component is operable in its first position to couple said pump component for rotation with said first rotary member to establish said engaged state of said pump clutch and shift said fluid pump into an operative mode for generating said fluid pump action, and wherein said clutch component is operable in its second position to release said pump component from rotation with said first rotary member to establish said disengaged state of said pump clutch and shift said fluid pump into an inoperative mode for interrupting said fluid pumping action.

5. The torque coupling of claim 1 wherein said pump clutch includes a first clutch component fixed for rotation with said first rotary member, a second clutch component fixed for rotation with said pump component and a power-operated actuator, wherein said power-operated actuator is operable in a first state to couple said second clutch component with said first clutch component for causing said pump component to rotate with said first rotary member, and wherein said power-operated actuator is operable in a second state to uncouple said second clutch component from said first clutch component for preventing said pump component from rotating with said first rotary member.

6. A torque coupling, comprising:
    a first rotary member;
    a second rotary member;
    a torque transfer clutch operably disposed between said first and second rotary members;

a fluid pump operable for generating a fluid pumping action in response to rotation of a pump component;
a pump clutch operable for selectively coupling said pump component to one of said first and second rotary members; and
a control system for selectively actuating said pump clutch, wherein said pump clutch includes a hub fixed for rotation with said first rotary member and a power-operated actuator, and wherein said powered-operated actuator is operable for moving said hub between first and second positions, said hub is operable in its first position to engage said pump component and in its second position to be displaced from said pump component.

7. The torque coupling of claim 6 wherein said hub includes a first tapered surface operable to engage a second tapered surface formed on said pump component when located in its first position.

8. The torque coupling of claim 6 wherein said hub includes clutch teeth operable to engage clutch teeth on said pump component when located in its first position.

9. The torque coupling of claim 6 wherein said power-operated actuator includes an electric motor operable for moving said hub between its first and second positions.

10. The torque coupling of claim 6 wherein said powered-operated actuator includes an electromagnetic solenoid and a mechanism for moving said hub in response to energization of said solenoid.

11. The torque coupling of claim 10 wherein said mechanism is a pivot linkage coupling a moveable output member of said solenoid to said hub.

12. The torque coupling of claim 10 wherein said mechanism includes a ball ramp unit disposed between said solenoid and said hub.

13. A torque coupling, comprising:
a first rotary member;
a second rotary member;
a torque transfer clutch operably disposed between said first and second rotary members;
a fluid pump operable for generating a fluid pumping action in response to rotation of a pump component;
a pump clutch operable for selectively coupling said pump component to one of said first and second rotary members; and
a control system for selectively actuating said pump clutch, wherein said fluid pump is operable to supply fluid from a sump to lubricate and cool clutch plates associated with said torque transfer clutch.

14. A torque coupling, comprising:
first and second rotary members;
a torque transfer clutch disposed between said first and second rotary members;
a fluid pump having a stationary housing containing a rotary pump component;
a pump clutch operable in an engaged mode when said pump component is coupled to said first rotary member and in a disengaged mode when said pump component is released from coupled engagement with said first rotary member; and
a control system for selectively shifting said pump clutch between its engaged and disengaged modes.

15. The torque coupling of claim 14 wherein said pump clutch includes a clutch component that is moveable between first and second positions and a power-operated actuator for controlling movement of said clutch component, and wherein said control system is operable for generating and sending a control signal to said power-operated actuator for moving said clutch component between its first and second positions.

16. The torque coupling of claim 15 wherein said clutch component is operable in its first position to couple said pump component for rotation with said first rotary member to establish said engaged mode of said pump clutch and shift said fluid pump into an operative mode for generating said fluid pump action, and wherein said clutch component is operable in its second position to release said pump component from rotation with said first rotary member to establish said disengaged mode of said pump clutch and shift said fluid pump into an inoperative mode for interrupting said fluid pumping action.

17. The torque coupling of claim 14 wherein said pump clutch includes a first clutch component fixed for rotation with said first rotary member, a second clutch component fixed for rotation with said pump component and a power-operated actuator, wherein said power-operated actuator is operable in a first state to couple said second clutch component with said first clutch component for causing said pump component to rotate with said first rotary member, and wherein said power-operated actuator is operable in a second state to uncouple said second clutch component from said first clutch component for preventing said pump component from rotating with said first rotary member.

18. A torque coupling, comprising:
first and second rotary members;
a torque transfer clutch disposed between said first and second rotary members;
a fluid pump having a rotary pump component;
a pump clutch operable in an engaged mode when said pump component is coupled to said first rotary member and in a disengaged mode when said pump component is released from coupled engagement with said first rotary member; and
a control system for selectively shifting said pump clutch between its engaged and disengaged modes, wherein said pump clutch includes a hub fixed for rotation with said first rotary member and a power-operated actuator, and wherein said powered-operated actuator is operable for moving said hub between first and second positions, said hub is operable in its first position to engage said pump component and in its second position to be displaced from said pump component.

19. The torque coupling of claim 18 wherein said hub includes a first tapered surface operable to engage a second tapered surface formed on said pump component when located in its first position.

20. The torque coupling of claim 18 wherein said hub includes clutch teeth operable to engage clutch teeth on said pump component when located in its first position.

21. The torque coupling of claim 18 wherein said power-operated actuator includes an electric motor operable for moving said hub between its first and second positions.

22. The torque coupling of claim 18 wherein said powered-operated actuator includes an electromagnetic solenoid and a mechanism for moving said hub in response to energization of said solenoid.

23. A torque coupling, comprising:
first and second rotary members;
a torque transfer clutch disposed between said first and second rotary members;
a fluid pump having a rotary pump component;
a pump clutch operable in an engaged mode when said pump component is coupled to said first rotary member and in a disengaged mode when said pump component is released from coupled engagement with said first rotary member; and a control system for selectively shifting said pump clutch between its engaged and disengaged modes, wherein said fluid pump is a gerotor pump having an inner rotor as its pump component, and wherein said pump clutch is operable for releaseably coupling said inner rotor for rotation with said first rotary member.

24. A torque coupling, comprising:

a first rotary member;

a second rotary member;

a torque transfer clutch disposed between said first and second rotary members;

a fluid pump for generating a fluid pumping action in response to rotation of a pump component positioned within a stationary pump housing;

a pump clutch disposed between said first rotary member and said pump component; and a pump clutch actuator for selectively coupling said pump component to said first rotary member.

25. The torque coupling of claim 24 wherein said pump clutch has a moveable clutch component, and wherein said pump clutch actuator controls movement of said clutch component.

26. The torque coupling of claim 25 wherein said moveable clutch component of said pump clutch is operable in a first position to couple said pump component for rotation with said first rotary member so as to shift said fluid pump into an operative mode, and wherein said moveable clutch component is operable in a second position to release said pump component from coupled engagement with said first rotary member so as to shift said fluid pump into a non-operative mode.

27. The torque coupling of claim 26 further comprising a control system for generating and sending a control signal to said pump clutch actuator that is operable to control movement of said moveable clutch component between its first and second positions.

* * * * *